(12) United States Patent
Twardawski et al.

(10) Patent No.: US 6,533,327 B1
(45) Date of Patent: Mar. 18, 2003

(54) QUICK-FITTING COUPLING

(75) Inventors: Harald Twardawski, Rastatt (DE); Thomas Luft, Au Am Rhein (DE)

(73) Assignee: Aeroquip-Vickers International GmbH, Baden-Baden (DE)

(*) Notice: Subject to any disclaimer, the term of this patent is extended or adjusted under 35 U.S.C. 154(b) by 0 days.

(21) Appl. No.: 09/552,077

(22) Filed: Apr. 19, 2000

(30) Foreign Application Priority Data

Apr. 21, 1999 (DE) .......................... 199 18 174

(51) Int. Cl.⁷ .................................. F16L 17/00
(52) U.S. Cl. .................. 285/110; 285/95; 285/111; 285/321
(58) Field of Search .................. 277/611, 638, 277/640, 619; 285/95, 110, 111, 305, 321

(56) References Cited

U.S. PATENT DOCUMENTS

| | | | |
|---|---|---|---|
| 2,398,399 A | * | 4/1946 | Alexander |
| 2,969,998 A | | 1/1961 | Rodaway |
| 3,698,744 A | * | 10/1972 | Bevington .................. 285/111 |
| 4,111,464 A | * | 9/1978 | Asano et al. ................ 285/111 |
| 4,361,335 A | | 11/1982 | Vinciguerra |
| 4,511,152 A | | 4/1985 | Fournier |
| 4,768,551 A | | 9/1988 | Allread et al. |
| 4,892,117 A | | 1/1990 | Spalink et al. |
| 5,123,446 A | | 6/1992 | Haunhorst et al. |
| 5,139,049 A | | 8/1992 | Jensen et al. |
| 5,226,682 A | | 7/1993 | Marrison et al. |
| 5,339,862 A | | 8/1994 | Haunhorst |
| RE34,781 E | | 11/1994 | Spalink et al. |
| 5,415,200 A | | 5/1995 | Haunhorst et al. |
| 5,464,042 A | | 11/1995 | Haunhorst |
| 5,472,016 A | | 12/1995 | Szabo |
| 5,482,083 A | | 1/1996 | Jenski |
| 5,505,498 A | * | 4/1996 | Halling et al. .............. 285/111 |
| 5,544,858 A | | 8/1996 | Rogers et al. |
| 5,553,895 A | | 9/1996 | Karl et al. |
| 5,570,910 A | | 11/1996 | Highlen |
| 5,709,243 A | | 1/1998 | Wells et al. |
| 5,893,391 A | | 4/1999 | Jenski, Jr. |
| 6,041,818 A | | 3/2000 | Schadewald et al. |
| 6,056,010 A | | 5/2000 | Wells |
| 6,183,020 B1 | | 2/2001 | Luft |

FOREIGN PATENT DOCUMENTS

| | | |
|---|---|---|
| DE | 2050868 | 10/1970 |
| DE | 19715293 | 4/1997 |
| DE | 19812544 | 3/1998 |

OTHER PUBLICATIONS

International Search Report for EP 00107947 which corresponds to this U.S. application.

* cited by examiner

*Primary Examiner*—Eric Culbreth
(74) *Attorney, Agent, or Firm*—Emch, Schaffer, Schaub & Porcello Co., L.P.A.

(57) ABSTRACT

A quick-fitting pipe union is proposed with an insertion component, a socket component and at least one sealing element. The sealing element (7) excels by virtue of the feature that it comprises a connecting section (9) and two lips (11) that extend outward from the connecting section (9).

11 Claims, 3 Drawing Sheets

QUICK-FITTING COUPLING

CROSS-REFERENCE TO RELATED APPLICATION

This application is based upon and claims the benefit of German Patent Application No. 19918174.8 filed Apr. 21, 1999.

BACKGROUND OF THE PRESENT INVENTION

The invention pertains to a quick-fitting pipe union having an insert component and a socket component including a new and improved sealing element as well as to a process for assembling a quick-fitting pipe union.

Quick-fitting pipe unions of the type that is being addressed here are known. They serve for connecting two hollow objects that are capable of accommodating a medium that is flowing through them. They comprise, in essence, an insertion component and a socket component, whereby the insertion component is introduced into the socket component in order to make the connection. Quick-fitting pipe unions also have sealing elements in order to ensure a leak-proof connection between the insertion component and the socket component. These sealing elements are preferably constructed in annular form and are usually pushed over the insertion component before the insertion component is introduced into the socket component. However, it is also conceivable that the sealing element is introduced into the socket component before the insertion component is pushed into the socket component.

Sealing elements are known with many different sorts of cross-sectional contours, e.g. ring-shaped and polygon-shaped including triangular-shaped or square-shaped contours. It has been found that the quick-fitting pipe union becomes leaky under some operating conditions and exchange of the quick-fitting pipe union or, at least, of the sealing elements is required.

The objective of the invention is therefore to create a quick-fitting pipe union that does not exhibit this disadvantage.

This objective is accomplished by a quick-fitting pipe union that has a sealing element which comprises two lips that extend out from an elastic connecting section. The quick-fitting pipe union excels by virtue of an annular sealing element with an elastic connecting section and two lips that extend outward from the connecting section. Loss-free, (i.e. leak-free) sealing between the insertion component and the socket component of the quick-fitting pipe union is possible as a result of the specific configuration of the sealing element of the quick-fitting pipe union. In conventional seals with elastomeric sealing elements, one of the most decisive parameters for freedom from leakage of the connection is the pressure deformation remnant (DVR) or, respectively, the relaxation of tension and the restoring force; however, in the case of the sealing element that is presented here, it can be guaranteed that the two lips of the sealing element are connected to one another in such a way via the elastic connecting section that the sealing element makes contact with the insertion component or, respectively, the socket component in an elastically springy manner even when the quick-fitting pipe union has been opened and closed repeatedly.

In a preferred example of an embodiment of the quick-fitting pipe union, the connecting section describes, in essence, a circular arc when considered in cross-sectional form and in the uncoupled state of the quick-fitting pipe union. Very good springy forces can be achieved within the sealing element as a result of the circular arc shaped connecting section; hence this sealing element can be compressed in an elastically springy manner when closing the quick-fitting pipe union without the occurrence of plastic deformation that would lead to permanent deformation of the sealing element and thus leak-free sealing of the quick-fitting pipe union would not be guaranteed when opening and re-closing the quick-fitting pipe union.

The feature is provided in a preferred example of an embodiment of the quick-fitting pipe union that the circular arc extends over an angle of 200° to 360° in the situation in which the quick-fitting pipe union is uncoupled. This large arc of the connecting section guarantees high elasticity of the two lips of the sealing element even after repeated actuation of the quick-fitting pipe union.

A preferred example of an embodiment of the quick-fitting pipe union excels by virtue of the feature that the two lips stand out at an essentially obtuse angle, preferably at right angles, from the ends of the connecting section. An especially large separation thereby arises between the two lips so that these lips can also span a large sealing region.

A further preferred example of an embodiment of the quick-fitting pipe union excels by virtue of the feature that one lip is bent in the situation in which the quick-fitting pipe union is uncoupled. The curved lip is bent back again when closing the quick-fitting pipe union and is characterized by high restoring forces that permit especially good sealing action.

A further preferred example of an embodiment of the quick-fitting pipe union has a groove, which runs in an annular manner, in the socket component and a first oblique projecting region, which runs in an annular manner, in the insertion component. In the situation in which the quick-fitting pipe union is closed, one lip of the sealing element supports itself on the base of the groove of the socket component and the other lip supports itself on the first oblique region of the insertion component. In the case of a quick-fitting pipe union that has been completely closed in an improper manner, the process of pushing the insertion component out of the socket component is rendered especially favorable as a result of this configuration of the surfaces of the insertion component or, respectively, the socket component and, as a result, the correct positioning of the insertion component in the socket component is simultaneously indicated to the user.

A retaining element is assigned to the quick-fitting pipe union in a further preferred example of an embodiment of the invention, whereby the retaining element supports itself on a recess in the socket component and on the first oblique region of the insertion component in the situation in which the quick-fitting pipe union is uncoupled. The retaining element serves for axially fixing the quick-fitting pipe union in position when introducing the insertion component into the socket component. In the situation in which the quick-fitting pipe union is closed, the retaining element, which is preferably configured in an annular shape, supports itself on the first oblique region of the socket component and on a second oblique region of the insertion component.

In a further example of an embodiment of the quick-fitting pipe union, the surfaces of the insertion component and of the socket component are configured and optimized with respect to one another in such a way that, in the situation in which the quick-fitting pipe union is not closed completely, the insertion component is pushed out of the socket component as a result of the spring-like action of the sealing element. For this purpose, the surface of the insertion component or, respectively, of the socket component has various oblique regions and grooves as already described.

A preferred example of an embodiment of the quick-fitting pipe union excels by virtue of the feature that the medium, which is flowing through the quick-fitting pipe union, can be present in various states of aggregation. The medium can be a liquid, preferably a refrigerant such as R12, R134-a, or a hydraulic oil e.g. ATF (automatic transmission fluid), Pentosin, or another oil (engine oil, gear oil) or fuel (automobile engine fuel, Diesel engine fuel, kerosene) or water or a similar fluid. However, the quick-fitting pipe union can also have a gaseous medium flowing through it, preferably air, carbon dioxide, propane or isobutane.

The objective is also accomplished by means of a process for assembling specific components. When assembling the quick-fitting pipe union, the sealing element is first pressed into the groove in the socket component by means of a preferably rod-shaped tool that is also termed an installation mandrel. The sealing element supports itself on the base of the groove of the socket component and is axially fixed in position as a result. The insertion component is then introduced into the socket component.

BRIEF DESCRIPTION OF THE DRAWINGS

The invention will be elucidated in more detail in the following sections by means of the set of drawings. The following aspects are shown.

DESCRIPTION OF THE PREFERRED EMBODIMENT

Figure 1:
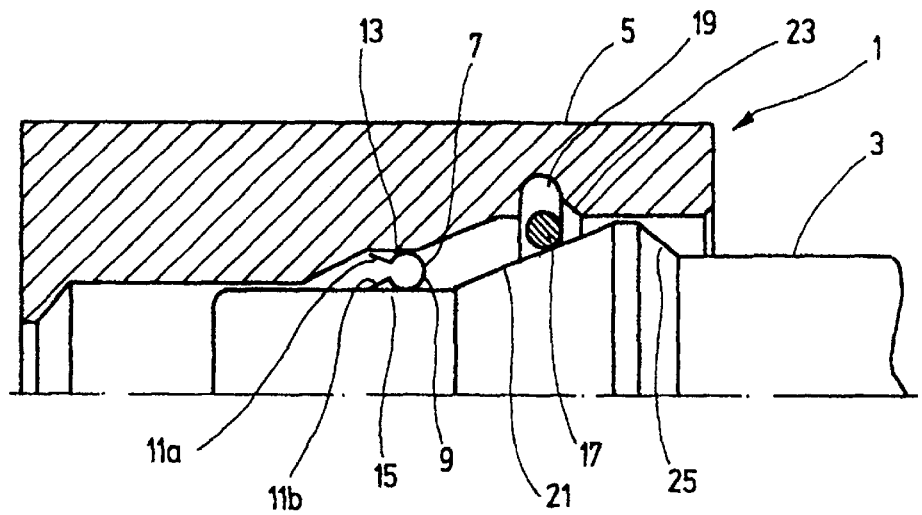
FIG. 1 shows the upper half of a quick-fitting pipe union, in the form of a longitudinal section, in the uncoupled state.

FIG. 1 shows the upper half of a quick-fitting pipe union 1 in the form of longitudinal section. The quick-fitting pipe union 1 comprises an insertion component 3 and a socket component 5. FIG. 1 hereby shows the quick-fitting pipe union 1 in the uncoupled state, i.e. the insertion component 3 has not been pushed completely into the socket component 5. An annular sealing element 7 is located between the insertion component 3 and the socket component 5. A connecting section 9 and the lips 11, which extend away from its ends, of the sealing element 7 can be seen clearly in the example of an embodiment of the quick-fitting pipe union that is illustrated in FIG. 1. The upper part of the connecting section 9 and the end of the upper lip 11a are in a state of contact-type connection to the base of a groove 13 that has been introduced into the inner surface of the socket component 5. The lower part of the connecting section 9 and the end of the lower lip 11b abuts a front region 15 of the insertion component 3. A retaining element 17 and a recess 19, which accommodates the retaining element 17 and which is provided in the socket component 5, and a first oblique region 21, which supports the retaining element 17, of the insertion component 3 can also be seen in FIG. 1.

Figure 2:
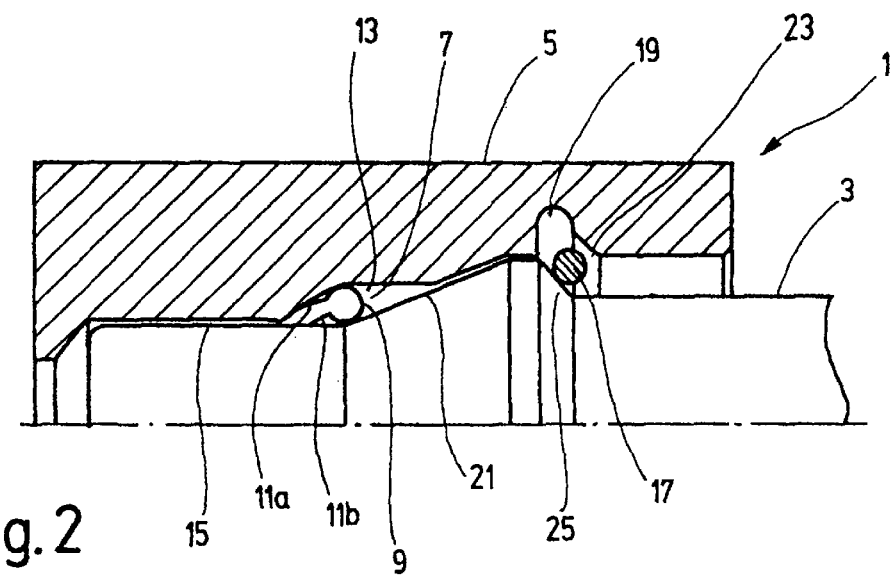
FIG. 2 shows the upper half of a quick-fitting pipe union, in the form of a longitudinal section, in the closed state.

FIG. 2 shows the quick-fitting pipe union 1 in the closed state. Parts that are the same as in FIG. 1 are provided with the same reference numbers so that, as far as this is concerned, reference is made to the description of FIG. 1. The sealing element 7 is now in the deformed state. The two lips 11 have been moved more closely together whereas the connecting section 9, which is curved in the shape of a circular arc, is bent further together. FIG. 2 also shows that the regions of the upper lip 11a and those of the upper part of the connecting section 9, which act as sealing sections, support themselves on the groove 13 and the end of the lower lip 11b supports itself on the front region 15 and the sealing section in the lower part of the connecting section 9 supports itself on the first oblique region 21 of the insertion component 3. It can also be seen that the retaining element 17 rests on a second oblique region 25 of the insertion component 3.

Figures 3, 4:
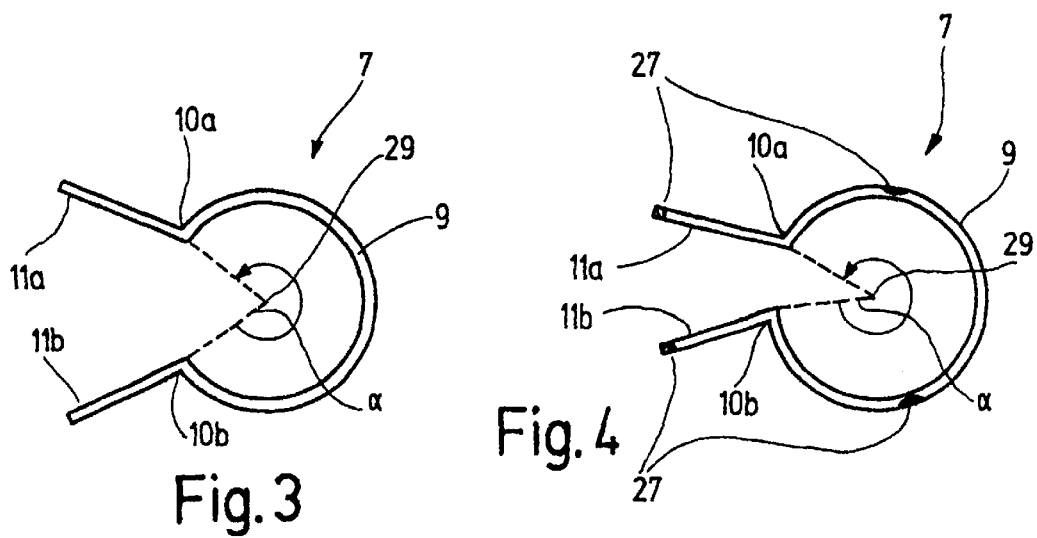
FIG. 3 shows a sealing element, in the non-deformed state, in accordance with a first example of an embodiment of the quick-fitting pipe union.
FIG. 4 shows the sealing element of FIG. 3 in the deformed state.

The sealing element 7, which was explained by means of FIGS. 1 and 2 and which is similar in shape to the Greek letter Ω, is illustrated in enlarged form in FIG. 3. It can be seen clearly that the upper lip 11a and the lower lip 11b extend away from the connecting section 9 that has, in essence, the shape of a circular arc. The definition of the central angle α is also understandable via FIG. 3: its flanks are the connecting lines between the midpoint 29 and the upper end 10a or, respectively, the lower end 10b of the connecting section 9 that has the shape of a circular arc.

FIG. 4 shows the sealing element 7 in the deformed state. Parts that are the same as in FIG. 3 carry the same reference numbers. It can be seen that the central angle α is larger in the case where the sealing element 7 is deformed than in the case where the sealing element 7 is not deformed. FIG. 4 also shows sealing sections 27. These are the regions of the sealing element 7 that are in a state of contact-type connection to the surface of the insertion component 3 or, respectively, the socket component 5 in the situation in which the quick-fitting pipe union 1 is closed. It can be seen that the upper lip 11a and the lower lip 11b have been moved more closely together.

The quick-fitting pipe unions that are illustrated in FIGS. 5, 6, 7 and 8 correspond to the quick-fitting pipe unions of FIGS. 1, 2, 3 and 4 but, in FIGS. 5 through 8, the sealing element 40 is shown in accordance with a further preferred example of an embodiment of the invention. Parts that are the same as in FIGS. 1 through 4 are provided with the same reference numbers. In the case of the example of an embodiment of the quick-fitting pipe union that is illustrated in FIGS. 5 through 8, the two lips 41a and 41b thrust directly onto one another. Here, therefore, the connecting section 9 is reduced to essentially the region in which the ends of the two lips 41a and 41b contact one another. This example of an embodiment has the advantage that it has a lower weight and takes up less volume and is also simple and inexpensive to manufacture. It can be seen in FIGS. 5 and 6 that the groove 13, on which the upper lip 41a rests, is configured differently compared to FIGS. 1 and 2. As a result, the process of pushing the insertion component out of the socket component in the case where a quick-fitting pipe union has not been completely closed is especially encouraged and thus the indication of the correct positioning of the insertion component in the socket component is assisted to a special extent. In this case, the upper lip 41a of the sealing element 7 presses against the upper surface of the groove 13 and the lower lip 41b presses on the conical part of the insertion component 3 thereby pushing the insertion component 3 out of the socket component 5.

Figure 5:
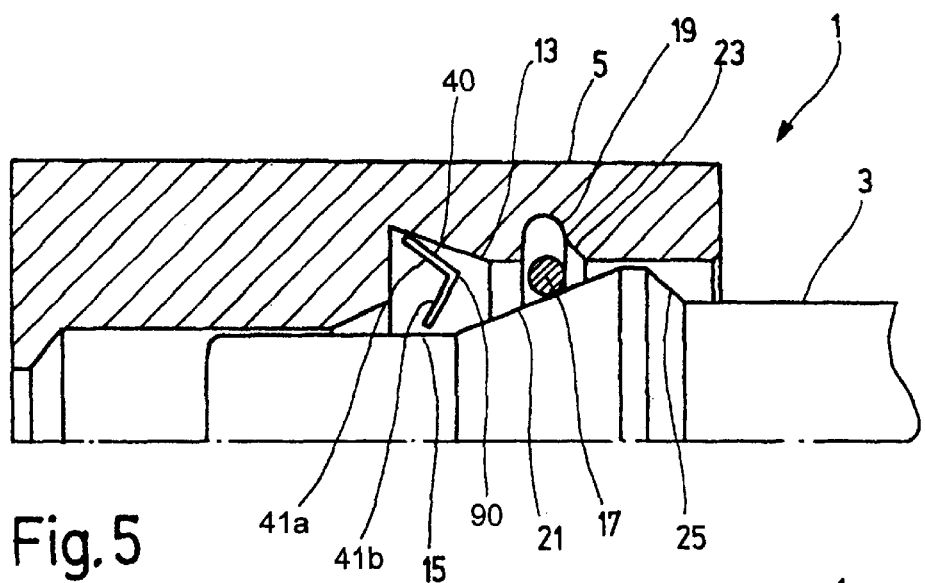
FIG. 5 shows a quick-fitting pipe union in the uncoupled state with a sealing element in accordance with a further example of an embodiment of the invention.
Figure 6:
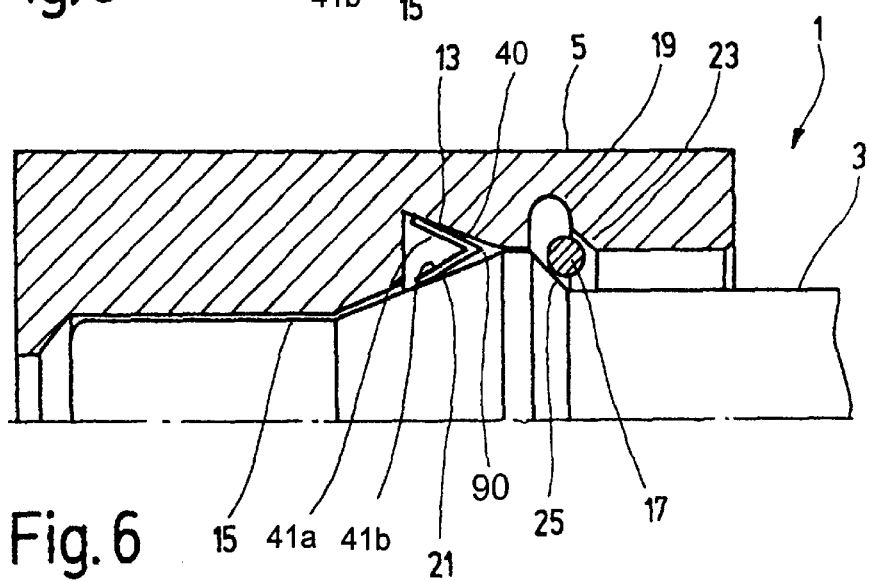
FIG. 6 shows the quick-fitting pipe union of FIG. 5 in the closed state.
Figure 7:
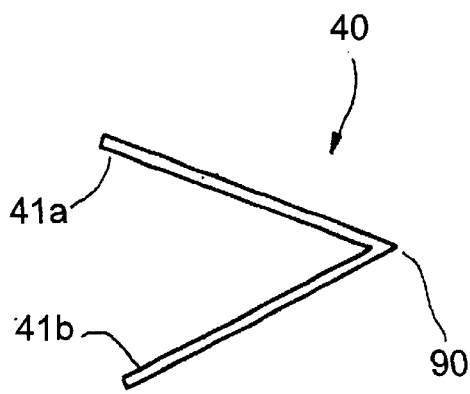
FIG. 7 shows the sealing element, which is illustrated in FIGS. 5 and 6, in the non-deformed state.

FIG. 7 shows the sealing element 40, which has been constructed with an essentially V-shaped form, that finds use in the quick-fitting pipe union in accordance with FIGS. 5 and 6. It can readily be seen that the connecting section 90 comprises only the region in which the ends of the two lips 41a and 41b encounter one another.

Figure 8:
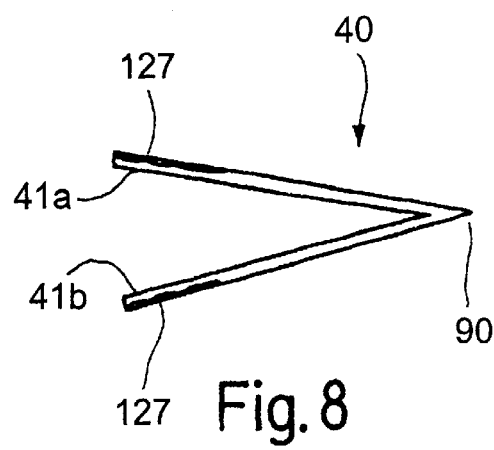
FIG. 8 shows the sealing element in accordance with FIG. 7 in the deformed state.

FIG. 8 shows the sealing element 40 of FIG. 7 when in the deformed state. It can readily be seen—in conformity with the different points of contact with the surface of the insertion component 5 that can be seen in FIG. 6—that the sealing sections 127 of the lips 41a and 41b are located at a different position, namely at the outer ends of lips 41a and 41b in this case.

FIGS. 9, 10, 11 and 12 correspond to FIGS. 1, 2, 3 and 4 or, respectively, 5, 6, 7 and 8. A sealing element 70 in accordance with a further preferred example of an embodiment is the only one that is illustrated here. Thus, as can be seen from FIGS. 9 and 10, the inner surface of the socket component 5 is, also shaped differently. In particular, the groove 13 in the socket component 5 has an essentially cylindrical region on which the upper lip 71a rests. The groove 13 is therefore configured in such a way that optimum accommodation of the upper lip 71a of the sealing element 70 is ensured. As is also the case in the examples of embodiments in FIGS. 2 and 6, the lower lip 71b supports itself on the front region of the insertion component 3.

Figure 9:
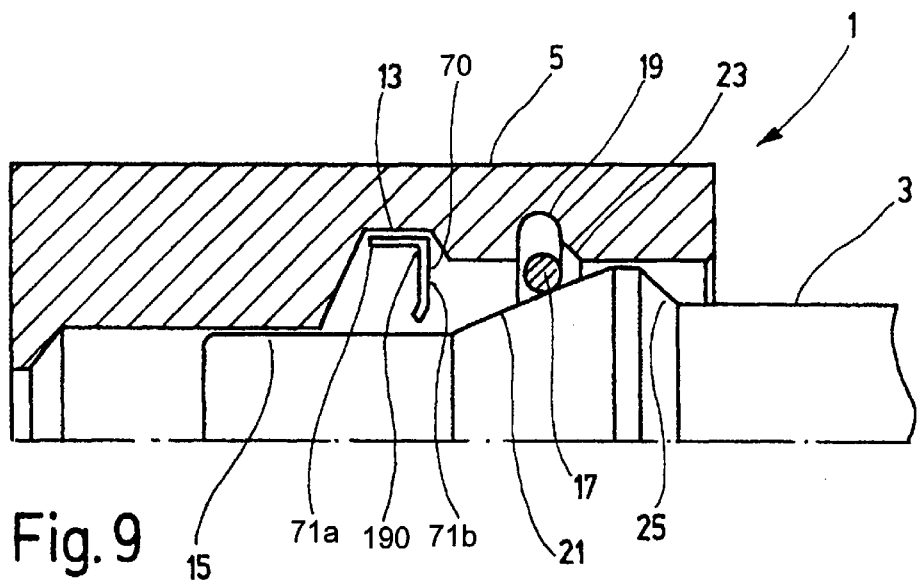
FIG. 9 shows a quick-fitting pipe union in the uncoupled state with a sealing element in accordance with a further example of an embodiment.
Figure 10:
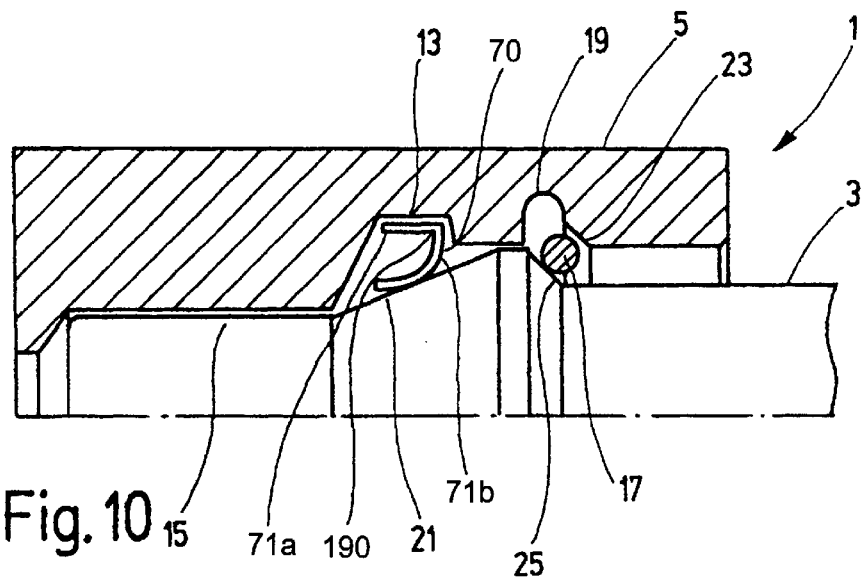
FIG. 10 shows the quick-fitting pipe union in accordance with FIG. 9 in the closed state.
Figures 11, 12:
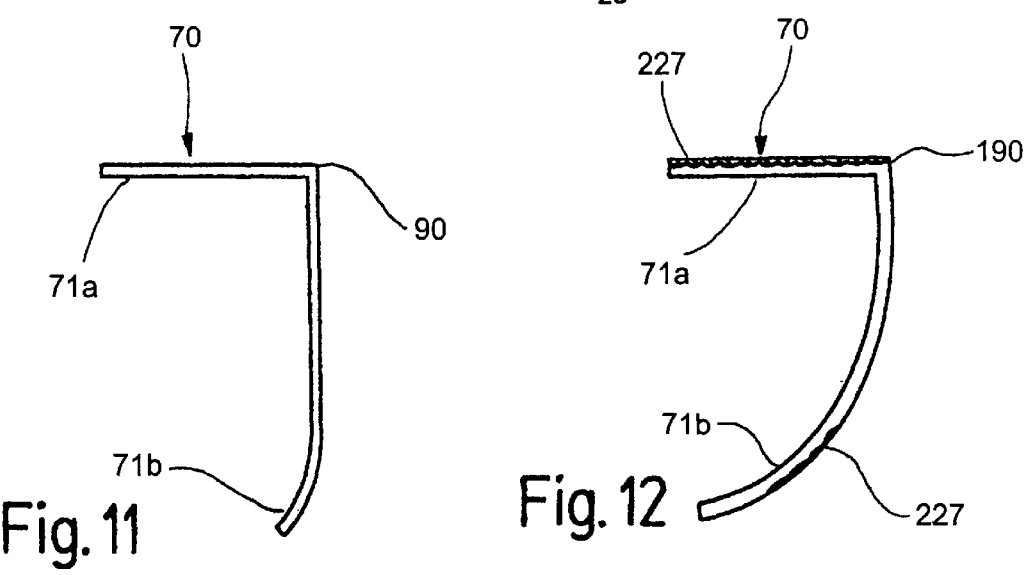
FIG. 11 shows the sealing element, which is illustrated in FIGS. 9 and 10, in the non-deformed state.
FIG. 12 shows the sealing element in accordance with FIG. 11 in the deformed state.

FIGS. 11 and 12 show the sealing element 70, which is constructed with an essentially U-shaped form, of the quick-fitting pipe union that is illustrated in FIGS. 9 and 10. It can be seen clearly in FIG. 12 that the sealing section 227 of the upper lip 71 a extends along the entire length of the upper lip 11a. A comparison of FIGS. 11 and 12 shows that, in the uncoupled and non-uncoupled states of the quick-fitting pipe union, the upper lip 71a progresses in an extended manner, i.e. rectilinearly, whereas the lower lip 71b is bent only in the lower region when the sealing element 70 is unstressed and hence the quick-fitting pipe union is uncoupled. In the plugged together state, the lip 71b is bent back again over a larger region of its length, whereby this aspect can be seen clearly from FIG. 12.

A feature that is common to all the examples of embodiments, which are illustrated in FIGS. 1 through 12, is that the sealing element 70 can be constructed with a relatively thin wall and is therefore very light. Thus material utilization is relatively low.

It is also found that the sealing element 70 is constructed in such a way that the lips 71a and 71b enclose, as it were, an inner zone of the sealing element 70. Thus the sealing element 70 is arranged within the quick-fitting pipe union 1 in such a way that this inner zone is impacted by pressure when using the quick-fitting pipe union. This pressure assists the process of prying open the sealing element 70, whereby such prying open is in any case provided via the spring-like action of the connecting section 190, in such a way that the lips 71a and 71b are pressed, in a seal-generating manner, onto the associated bearing surfaces of the insertion component 3 and the socket component 5.

During the introduction of the insertion component 3 into the socket component 5, the sealing element 70 is compressed and forces are initiated not only in the lips 71b and 71b but also, and in particular, in the connecting section 190, whereby these forces lead to internal pre-tensioning of the sealing element. This internal pre-tensioning produces a force that engenders prying open; as a result, the lips 71a and 71b are pressed, in a seal-generating manner, onto the associated bearing surfaces.

The sealing element is preferably elastically deformable so that repeated uncoupling and coupling of the quick-fitting pipe union is possible. The sealing element readopts its original shape when uncoupling the quick-fitting pipe union. Pressure deformation remnants, which are caused by the material used and which decisively influence a connection's freedom from leakage—in the way in which these occur with conventional O-rings—can be eliminated by using the sealing elements that are presented here. In this case, additionally, the sealing element 70 is also pried open by the pressure forces that are contained within the lips 71a and 71b and which act in the inner zone, and it is pressed, in a seal-generating manner, onto the insertion component and the socket component.

The sealing element 70 can be manufactured from a springy metal, preferably springy steel or a similar material, or from a soft metal, preferably brass, copper, aluminum, bronze or a similar material. The essential point is that optimum sealing in the region of the quick-fitting pipe union 1 is guaranteed in all cases and this is increased even further with increasing operating pressures.

High chemical resistance to fluid media is ensured in all cases as a result of the metallic materials. Likewise, thermal stability is significantly better than in the case of conventional O-seals that comprise elastomers.

An especially advantageous feature is that existing quick-fitting pipe unions can be upgraded at a calculably low cost in order to permit the use of sealing elements of the type that is described here.

The fact that axial play within the quick-fitting pipe union 1 can be avoided almost completely when using the sealing element 70, which is illustrated here, has been found to be especially advantageous and, as a result, dynamic resistance is improved. This avoidance of axial play is guaranteed by the spring-like action or, respectively, the internal pre-tensioning of the sealing element 70 and it can also compensate for manufacturing variations. As a result of pre-tensioning, the insertion component 3 lies in a quasi blocked position with the socket component 5.

The sealing action is improved still further by way of the feature that the sealing element is pried open by the increasing internal pressure of the connection; as a result, the force of the sealing sections 27 pressing down onto the bearing surfaces of the insertion component 3 and of the socket component 5 is increased.

If FIGS. 2, 6 and 10 are considered in particular, then it is found that, in the closed state of the quick-fitting pipe union 1, the sealing element 40 or 70, which acts as a spring-like element, collaborates with a first oblique region 21 of the insertion component 3 so that, basically, a force builds up that pushes the insertion component 3 out of the socket component 5. The representation in the designated figures shows that, in the plugged together state of the quick-fitting pipe union 1, the retaining element 17 collaborates with the second oblique region 25 of the insertion component 3 in such a way that this retaining element is pushed into the interior of the socket component 5. The retaining element 17 additionally supports itself on the first oblique region 23 of the socket component 5. The retaining element 17 may be a split ring. This type of connection between the insertion component 3 and the socket component 5 is also termed a "snap connection" by technical experts. Alternatively, if constructed of a material having sufficient elasticity, the retaining element 17 could be continuous.

Thus FIGS. 2, 6 and 10 show that the sealing element 70, which acts as a spring-like element, and the retaining element 17, which also acts as a spring-like element, develop forces that are opposed to one another. This leads to the situation in which the spring-like action of the sealing element 70 pushes the insertion component 3 out of the socket component 5 when the retaining element 17 has not engaged completely with the second oblique region 25. The sealing element 40 or 70 therefore pushes the insertion component 3 out of the socket component 5 when the quick-fitting pipe union 1 has not been completely closed. Thus a safeguarding function is achieved as a result of an appropriate arrangement of the oblique regions 21 and 25 and as a result of the spring-like action of the sealing element and of the retaining element 17. Incomplete insertion of the insertion component 3 into the socket 5 is indicated by the fact that the elastically springy sealing element 7 pushes the insertion component 3 out of the socket 5 if the retaining element 17 has not become correctly engaged. An indication of correct and leakage-free connection of the quick-fitting pipe union 1 is provided in this way.

It will be clear from what has been said above that the process for assembling the quick-fitting pipe union 1 is very simple. The sealing element 40 or 70 can easily be installed in the associated groove 13 in the socket component 5 with the help of an installation mandrel and such sealing element is axially fixed in position there. If the components of the quick-fitting pipe union 1 are correctly inserted into one another, then the retaining element 17, which is also capable of being installed with ease in the associated groove 19, supports itself on the second oblique region 25 of the insertion component 3 and thereby overcomes the forces that are initiated by the sealing element 40 or 70 via the first oblique region 21.

What is claimed is:

1. A fluid coupling comprising
   (a) an insertion component extending along an axis, said insertion component including a front region, a first oblique region extending outwardly away from said axis in a direction away from said front region and a second oblique region extending inwardly toward said axis in a direction away from said front region;
   (b) a socket component sized to receive said insertion component; and
   (c) a resilient wall metallic annular seal having a configuration defining, in cross-section, (i) a first lip sealingly engageable with said socket component, (ii) a second lip sealingly engageable with said insertion component first oblique region and (iii) a connecting section connecting said first lip to said second lip, said connecting section yieldingly supporting said first lip and said second lip for movement from a first spaced apart position when said insertion component is disengaged from said socket component to a second spaced apart position closer together when said insertion component is engaged to said socket component, movement of said insertion component into said socket component causing said second lip to engage and slide relative to said first oblique region and to become sealingly engaged to said insertion component.

2. A fluid coupling in accordance with claim 1, characterized by the feature that the connecting section (9), in cross-section, defines an essentially circular arc when the insertion component (3) is not engaged to said-socket component (5).

3. A fluid coupling in accordance with claim 2, characterized by the feature that said circular arc defines a central angle α of 200° to 360° when said insertion component (3) is not engaged to said socket component (4).

4. A fluid coupling in accordance with claim 1, characterized by the feature that, prior to movement of said insertion component into said socket component, at least one of the lips is bent.

5. A fluid coupling in accordance with claim 1, characterized by the feature that, said annular seal is a springy metal being a member selected from the group consisting of steel, brass, copper, aluminum and bronze.

6. A fluid coupling in accordance with claim 1, wherein said socket component has an insertion end for receiving said insertion component and an annular groove spaced from said insertion end and said insertion component has a portion of said first oblique region axially aligned with said annular groove when said insertion component is engaged to said socket component and characterized by the feature that said annular seal first lip supports itself in said groove in sealing engagement with said socket component and said second lip supports itself on said first oblique region in sealing engagement with said first oblique region.

7. A fluid coupling in accordance with claim 6, whereby said socket component has a recess between said insertion end and said annular groove and further including a retaining element supported in said recess and on said second oblique region.

8. A fluid coupling in accordance with claim 7, whereby said socket component recess has an abutment surface tapering outwardly away from said axis in a direction away from said insertion end, characterized by the feature that said retaining element supports itself on said abutment surface and on said second oblique region.

9. A pipe union assembly comprising
   (a) a male insertion component having
      (i) a front section extending along an axis;
      (ii) a first oblique region extending rearwardly from said front section and tapering outwardly away from said axis;
      (iii) a second oblique region extending rearwardly beyond said first oblique region and tapering inwardly toward said axis;
   (b) a socket component sized to receive said male component, said socket component including a receiving end, an inwardly facing annular recess spaced axially said from said receiving end in a position to overlie said second oblique region when said male insertion component is fully engaged in said socket component, an inwardly facing annular groove spaced axially from said receiving end beyond said annular recess, said annular groove having a bottom;

(c) a retaining element receivable in said annular recess and engageable with said second oblique region for retaining said male insertion component engaged to said socket component; and (d) an annular metallic sealing element positioned in said annular groove, said annular sealing element in cross-section having first and second resilient lips joined together at a connecting section, said resilient lips being deformable for movement of one toward the other upon axial movement of said male insertion component into said socket component, said first resilient lip sealingly contacting said groove bottom and said second resilient lip being urged closer to said first resilient lip by said first oblique region and becoming sealingly engaged to said first oblique region.

10. A pipe union assembly according to claim 9 wherein said sealing element connecting section is resilient.

11. A pipe union assembly according to claim 9 wherein upon axial movement of said male insertion component into said socket component with said sealing element sealingly engaged to (i) said male insertion component and (ii) said socket component, said pipe union assembly encloses pressurized fluid, said pressurized fluid being communication with said annular sealing element urging said first resilient lip into engagement with said groove bottom and said second resilient lip into engagement with said first oblique region.

* * * * *